United States Patent
Tapuska

(10) Patent No.: US 8,171,421 B2
(45) Date of Patent: *May 1, 2012

(54) PORTABLE ELECTRONIC DEVICE AND METHOD FOR DISPLAYING LARGE FORMAT DATA FILES

(75) Inventor: David Tapuska, Waterloo (CA)

(73) Assignee: Research in Motion Limited, Waterloo (CA)

( * ) Notice: Subject to any disclaimer, the term of this patent is extended or adjusted under 35 U.S.C. 154(b) by 79 days.

This patent is subject to a terminal disclaimer.

(21) Appl. No.: 12/794,814

(22) Filed: Jun. 7, 2010

(65) Prior Publication Data

US 2010/0241986 A1    Sep. 23, 2010

Related U.S. Application Data

(63) Continuation of application No. 11/700,176, filed on Jan. 31, 2007, now Pat. No. 7,761,807.

(51) Int. Cl.
*G06F 3/048* (2006.01)
(52) U.S. Cl. ........ 715/781; 715/765; 715/788; 715/864; 715/205; 345/169
(58) Field of Classification Search .................. 715/744, 715/745, 746, 747, 764, 765, 780, 781, 784, 715/785, 788, 789, 800, 856, 862, 864, 866, 715/205, 243; 345/156, 157, 169
See application file for complete search history.

(56) References Cited

U.S. PATENT DOCUMENTS

| | | | |
|---|---|---|---|
| 4,720,703 A | 1/1988 | Schnarel et al. |
| 5,801,677 A | 9/1998 | Obata |
| 6,081,277 A | 6/2000 | Kojima |
| 6,297,795 B1 | 10/2001 | Kato et al. |
| 6,300,947 B1 | 10/2001 | Kanevsky |
| 6,466,203 B2 | 10/2002 | Van Ee |
| 6,480,185 B1 | 11/2002 | Kiljander et al. |
| 6,952,220 B1 | 10/2005 | Rossmann |
| 7,581,176 B2 | 8/2009 | Wilson |
| 2004/0075672 A1 | 4/2004 | Vale et al. |
| 2004/0100509 A1 | 5/2004 | Sommerer et al. |
| 2004/0103371 A1 | 5/2004 | Chen et al. |
| 2004/0131043 A1 | 7/2004 | Keller |
| 2004/0250220 A1 | 12/2004 | Kalenius |
| 2004/0257385 A1 | 12/2004 | Kim et al. |
| 2005/0015726 A1 | 1/2005 | Tuominen |
| 2005/0021851 A1 | 1/2005 | Hamynen |
| 2005/0055632 A1 | 3/2005 | Schwartz et al. |
| 2005/0097444 A1 | 5/2005 | Ivarsey et al. |
| 2005/0172230 A1 | 8/2005 | Burk et al. |

(Continued)

FOREIGN PATENT DOCUMENTS

WO    WO02/082418    10/2002

*Primary Examiner* — Xiomar L Bautista
(74) *Attorney, Agent, or Firm* — Ridout & Maybee LLP

(57) ABSTRACT

A portable electronic device includes a rendering circuit to visualize large format data files on a narrow display. The large format data files are rendered using either a desktop display mode or a mobile display mode. The desktop display mode renders the data file using data file-specified dimensions and resolutions. The data file is viewable in its entirety by automatic scrolling achieved by moving a cursor near the edge of the display. Data file elements may be edited while in desktop display mode. The mobile display mode renders the elements of the data file as a list with minimal regard for spatial orientation. Navigation in mobile display mode is field-to-field.

10 Claims, 13 Drawing Sheets

U.S. PATENT DOCUMENTS

| | | |
|---|---|---|
| 2005/0198588 A1 | 9/2005 | Lin et al. |
| 2005/0223340 A1 | 10/2005 | Repka |
| 2005/0223342 A1 | 10/2005 | Repka et al. |
| 2005/0229111 A1 | 10/2005 | Makela |
| 2006/0064638 A1 | 3/2006 | Bocking |
| 2007/0101263 A1 | 5/2007 | Bedingfield |
| 2007/0139374 A1 | 6/2007 | Harley |

PORTABLE ELECTRONIC DEVICE AND METHOD FOR DISPLAYING LARGE FORMAT DATA FILES

CROSS-REFERENCE TO RELATED APPLICATIONS

The present application is a continuation of U.S. patent application Ser. No. 11/700,176 filed Jan. 31, 2007, the entire disclosure of which is incorporated herein by reference.

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD OF THE INVENTION

Embodiments of the invention relate generally to portable electronic devices and related methods.

BACKGROUND OF THE INVENTION

Portable electronic devices allow users to create, view, edit, receive and transmit data files from wherever the user is located. Received or created data files include any type of data file, including but not limited to emails, web pages, word processing documents, spreadsheets and image files. Data files are rendered on a portable electronic device display so that a user may view them. Some data files, however, are created for visualization on a large display (e.g., a computer monitor) and are referred to herein as large format data files. Large format data files include web pages, images and spreadsheets. Web pages include, but are not limited to, files encoded using hypertext markup language ("html") or extensible markup language ("xml"). Web pages include tags that instruct a web browser how to render and locate on the viewed page text and images associated with the page. Very often, web page tags include instructions that are optimized for viewing the web page on a large-screen display, such as a typical computer monitor.

For example, in FIG. 1A, a displayed web page 110 on a display 100 includes tags instructing that image A be displayed at the top left of the web page 110 and that image B be displayed at the top right of the web page 110. Image A and image B have predetermined dimensions including horizontal dimensions $x_A$ and $x_B$, respectively. Thus, if the display width $x_D$, is greater than the sum of the web page horizontal dimensions $x_A$ and $x_B$, the images A, B will be displayed as intended by the tags. However, if the display width $x_D$ is less than the sum of the web page horizontal dimensions $x_A$ and $x_B$, as shown in FIG. 1B, then the images will not be properly displayed and can overlap each other, for example. For at least this reason, web pages may require further processing when being rendered on a narrow display such as that used on a portable electronic device. Similarly, image files and spreadsheets may include images or fields that are wider than the display width of a portable electronic device display. In general, large format data files include fields or image regions that are designed to be viewed in their entirety and thus are ideally viewed on a display sufficiently large to visualize the entire field or image regions.

Generally, a portable electronic device display is not sufficiently large enough to visualize an entire large format data file in the same way that the large format data file is rendered on a large monitor. Accordingly, large format data files undergo additional processing steps in order to render the files onto a portable electronic device display. For example, a large format data file may be viewed in its entirety on a narrow display if the dimensions of the fields or image regions are correspondingly reduced. Often, however, dimensional reduction results in an unreadable image that must be selected and enlarged by a user in order to decipher the displayed data. Alternatively, a large format data file is subdivided into user-selected frames for sequential viewing on a narrow display. The viewed frames, however, often detract from the entirety of the image or field to be viewed.

Accordingly, an improved portable electronic device and method for displaying large format data files on a reduced-size display is desirable.

DETAILED DESCRIPTION OF THE INVENTION

Example embodiments and applications will now be described. It should be appreciated that other embodiments may be realized and structural or logical changes may be made to the disclosed embodiments.

Figure 1A:
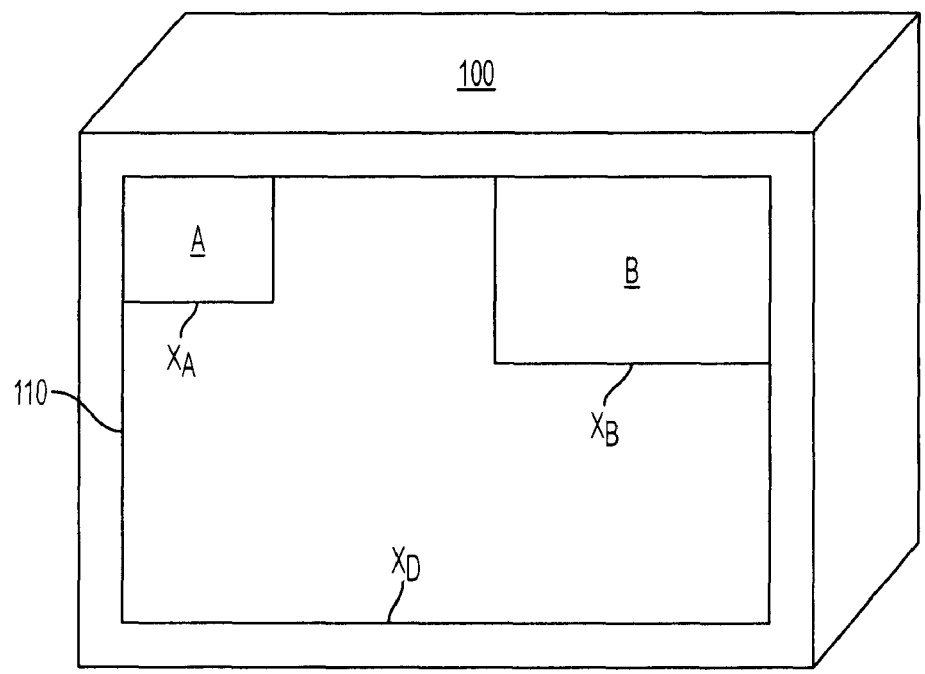
FIGS. 1A and 1B illustrate the rendering of a large format data file on a display.
Figure 1B:
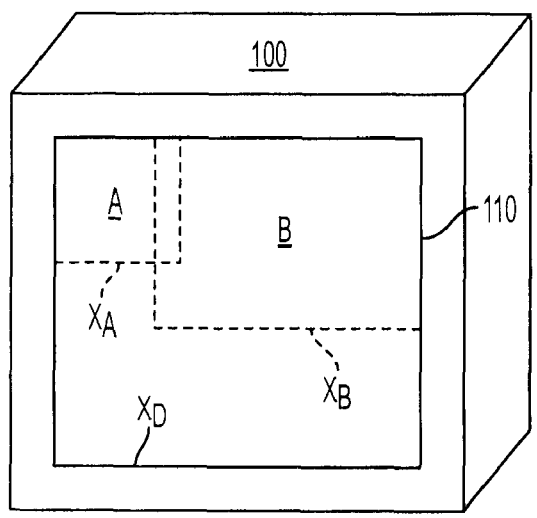
Figure 2A:
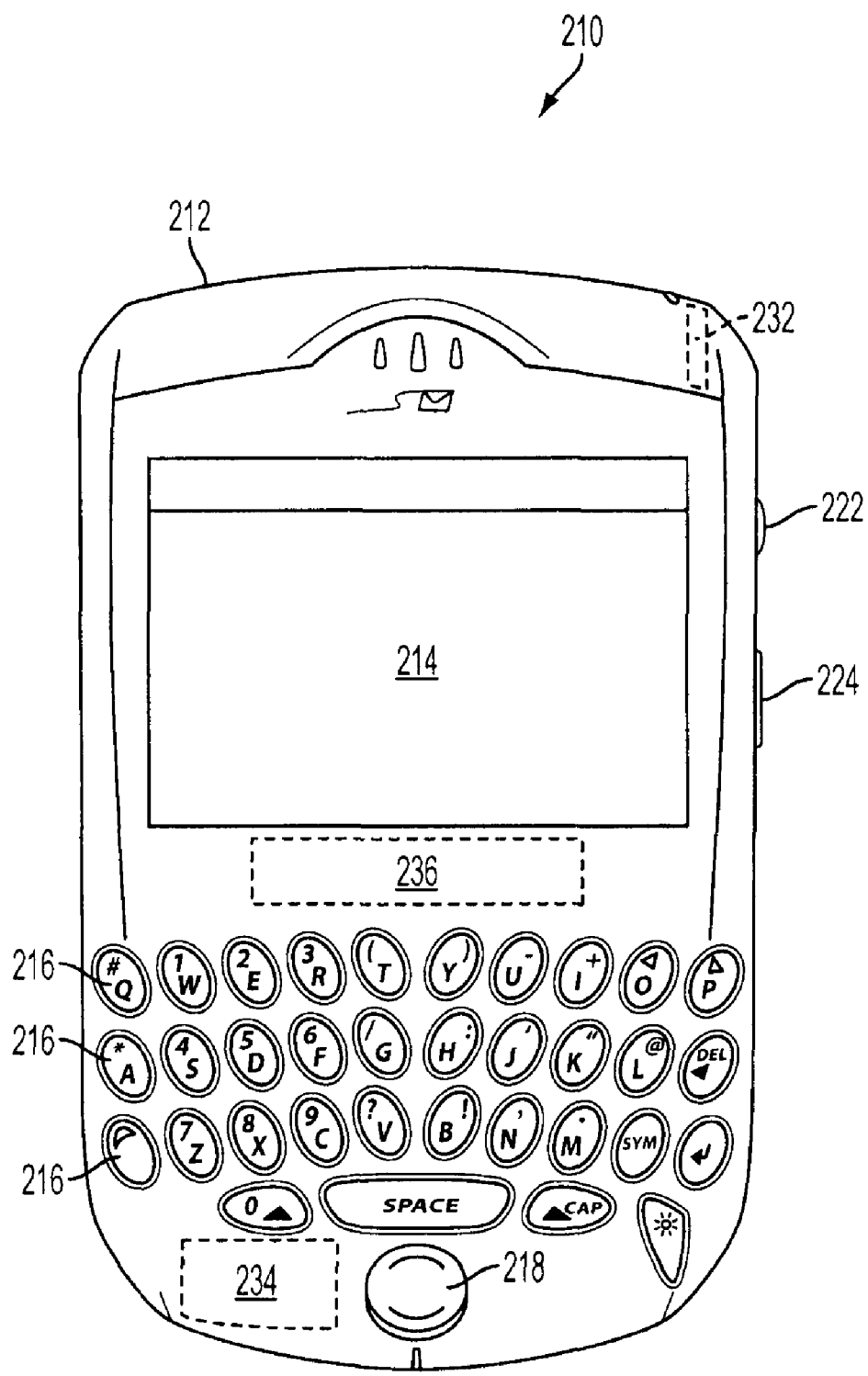
FIGS. 2A and 2B illustrate a portable electronic device for communicating with a network in accordance with an embodiment disclosed herein.

FIG. 2A illustrates a portable electronic device 210 that intelligently renders large format data files in one of two different display modes. The portable electronic device 210 may be a dual mode (simultaneous data and voice communication capabilities) or single mode communication device, personal digital assistant, etc. such as the device 800 described in further detail below in relation to FIG. 5. Such devices include Blackberry™ devices by Research in Motion Limited of Ontario, Canada, or Palm® Treo™ devices by Palm, Inc. of California, U.S.A. to name a few. In addition, the portable electronic device 210 may be a cellular telephone, etc. Large format data files are rendered using either a desktop display mode or a mobile display mode. The device 210 includes a portable housing 212, a display 214 and input keys 216. The device 210 also includes a depressible thumb navigator 222 (e.g., a thumb wheel) and a level up button 224. The depressible thumb navigator 222 is used by a user to navigate through menus and files visualized on the display 214. Alternatively, a depressible trackball 218 may be used to navigate through visualized menus and files. Desired menu options or files are selected by depressing the thumb navigator 222 or the trackball 218. The level up button 224 allows the user to visualize a next higher menu or option screen. The input keys 216 are used to enter text to create or modify a file, the input text being visualized on the display 214. The device 210 also includes a transceiver 232 for receiving and transmitting data. Received data includes e.g., files viewable on the display 214. Data to be transmitted includes e.g., data input into the device 210 using the input keys 216. The device 210 includes a battery 234 to supply power to internal circuitry, the display 214 and for generating electrical signals in response to operation of the input keys 216, the thumb navigator 222, the level up button 224, the trackball 218 and the transceiver 232.

Figure 2B:
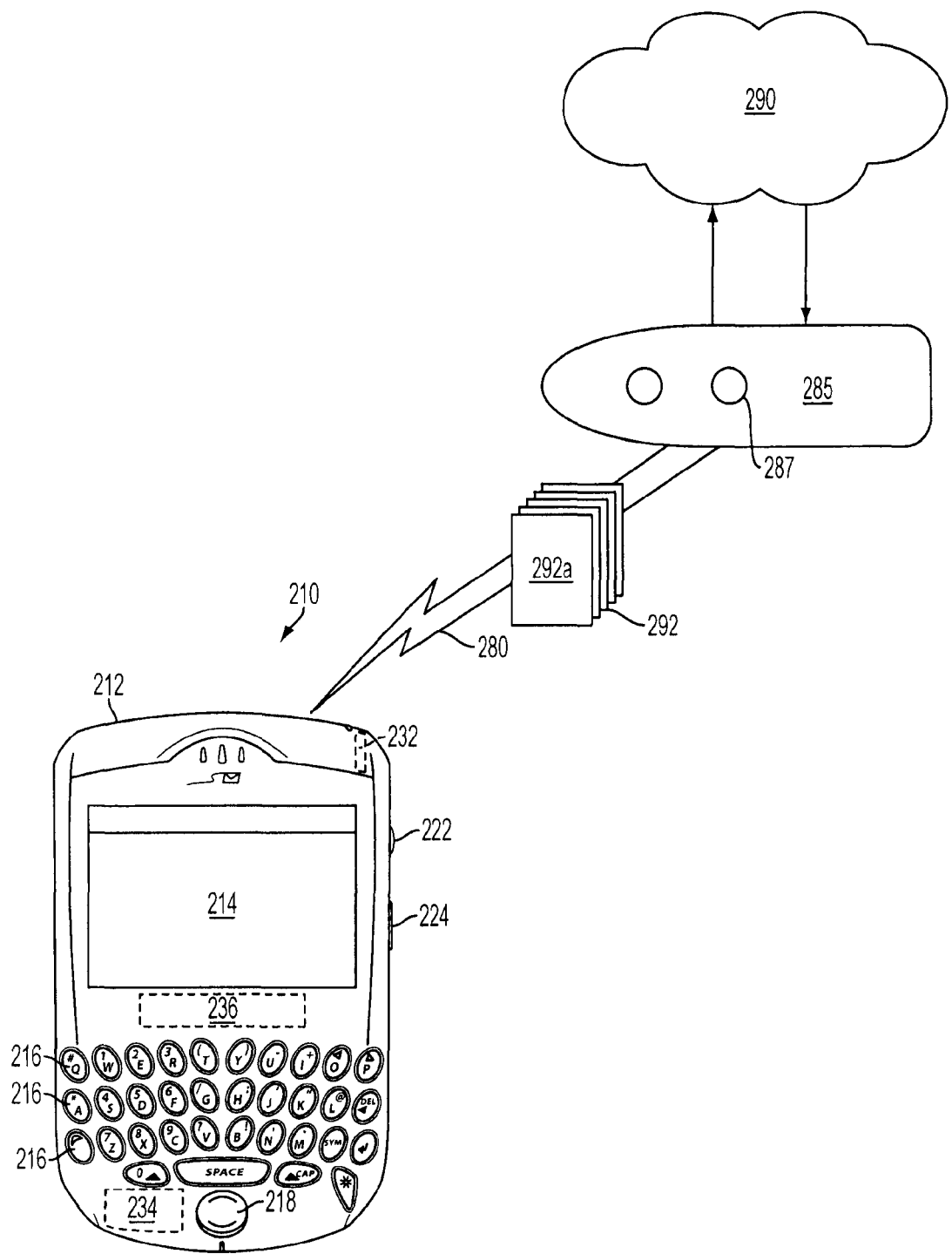

Portable electronic device 210 is configured to establish a connection 280 with a network 290, as illustrated in FIG. 2B. The network 290 may be a private or public network (e.g., the Internet). The connection 280 with the network 290 is preferably wireless, and thus utilizes at least one of a plurality of nodes 287, such as a base station, within a wireless network 285. Data files 292 are uploaded from and downloaded to the device 210 from the network 290 via the wireless network nodes 287. Data files 292 include any type of data file, including but not limited to emails, web pages, word processing documents, spreadsheets and image files. Data files 292 are rendered on the display 214 so that a user may view them. Some data files 292, for example, web pages, spreadsheets and images, are created for visualization on a large display (e.g., a computer monitor) and are herein referred to as large format data files.

A rendering circuit 236 is included in the device 210. When a user specifies that a data file 292a is to be viewed on the display 214, the rendering circuit 236 analyzes and processes the data file 292a for visualization on the display 214. Certain types of data files, specifically large format data files such as web pages, image files and spreadsheets, are rendered by the rendering circuit 236 to be displayed in either the desktop display mode or the mobile display mode. The rendering circuit 236 may be implemented as hardware, software, or as a combination of both hardware and software.

Figure 3A:
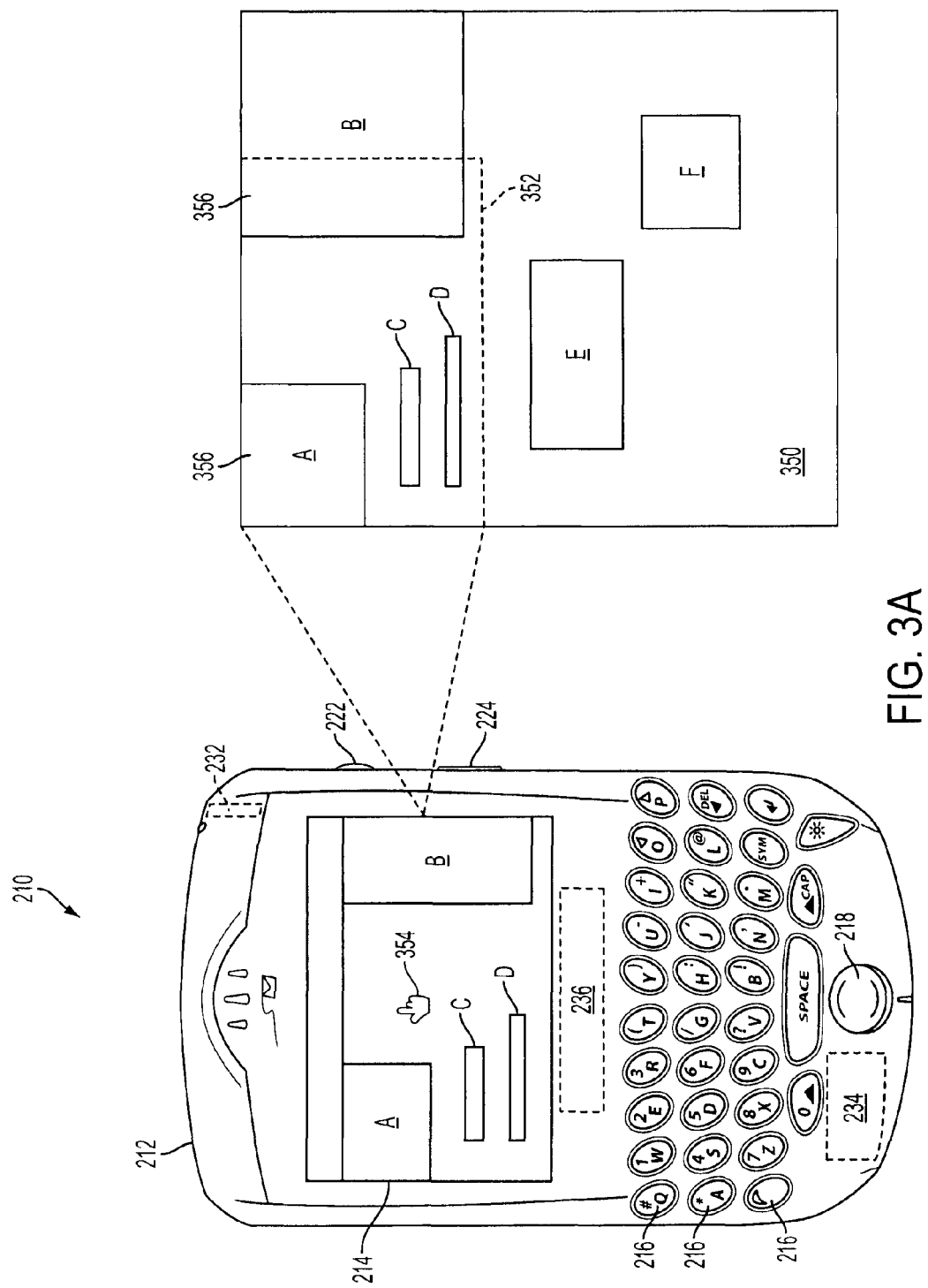
FIGS. 3A-3D illustrate the rendering of a large format data file on a display in accordance with an embodiment disclosed herein.

In the desktop display mode, as illustrated in FIG. 3A, a large format data file 350 is rendered as it would be on an imaginary large display, with only a portion 352 of the rendered file being viewable on the display 214. The viewable portion 352 shows elements 356 such as field C, link D and images A, B of the large format data file 350 using predetermined dimensions and resolutions as specified in the large format data file 350 (e.g., formatting instructions included in the tags of an html page). Thus, the elements 356 of the large format data file 350 visible in the viewable portion 352 are easily discernable because the elements 356 are viewed using the original element size and resolution. The file-specified spatial relationship between the elements 356 is also apparent to the user.

When the user desires to see additional non-visible portions of the large format data file 350, including elements E and F, the user operates the trackball 218, for example, to move a cursor 354 on the display 214. By operating the trackball 218, the cursor 354 is moved in any direction on the display 214, including vertically, horizontally and diagonally. The trackball 218 moves the cursor 354 smoothly and precisely with control equal to a resolution of the display 214. Using the trackball 218, the user moves the cursor 354 in the direction of the non-visible portions of the large format data file 350 that the user desires to view. When the cursor nears an edge of the display 214, the viewable portion 352 automatically scrolls in the direction of the approached edge. The scrolling is smooth and equal in resolution to the resolution of the display 214. The user may scroll the viewable portion 352 to any part of the large format data file 350 by moving the cursor 354 in the appropriate directions. For example, if the user moves the cursor 354 near the right edge of the display 214, the viewable portion 352 will scroll to the right until the user either moves the cursor 354 away from the edge of the display 214 or the right edge of the rendered data file is viewed. Similarly, the user may scroll the viewable portion 352 downward, upward or to the left by moving the cursor 354 near the lower, upper or left edges of the display 214, respectively. A user may scroll the viewable portion 352 diagonally by moving the cursor 354 near any corner of the display 214.

Figure 6A:
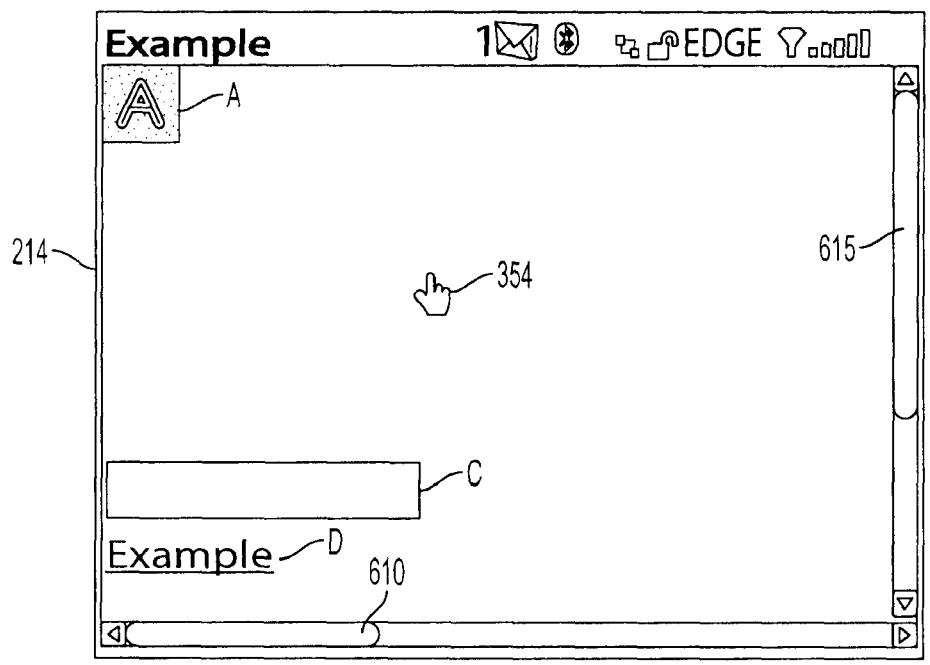
FIGS. 6A-6F are representative screenshots of a large format data file rendered on a display in accordance with an embodiment disclosed herein.
Figure 6B:
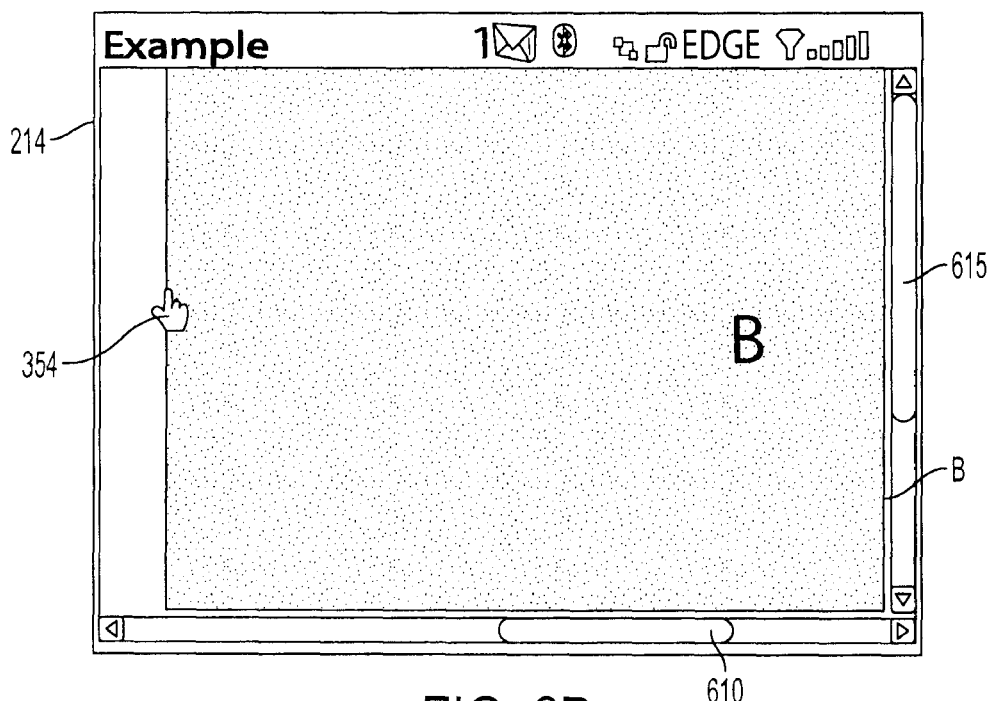

Screenshots demonstrating the desktop display mode and navigation via automatic scrolling are shown in FIGS. 6A and 6B. In FIG. 6A, a large format data file similar in layout to the large format data file 350 of FIG. 3A is rendered onto the display 214. The viewable portion includes image A, field C and link D. A horizontal scroll bar 610 and a vertical scroll bar 615 indicate the relative position of the viewable portion in relation to the entire large format data file. In FIG. 6A, the position of the horizontal scroll bar 610 indicates that additional viewable portions exist to the right of the currently viewable portion. In order to visualize the unseen viewable portions, the user moves the cursor 354 near the right edge of the display 214. Once the cursor 354 nears the edge, the viewable portion automatically scrolls in the direction of the approached edge. By scrolling to the right, the viewable portion reveals image B, as shown in FIG. 6B. The position of the horizontal scroll bar 610 and the vertical scroll bar 615 indicates to the user that additional unviewed portions exist to the right of and also below the current viewable portion. These may again be visualized by moving the cursor 354 near the right and lower edges of the display 214, respectively.

Figure 6C:
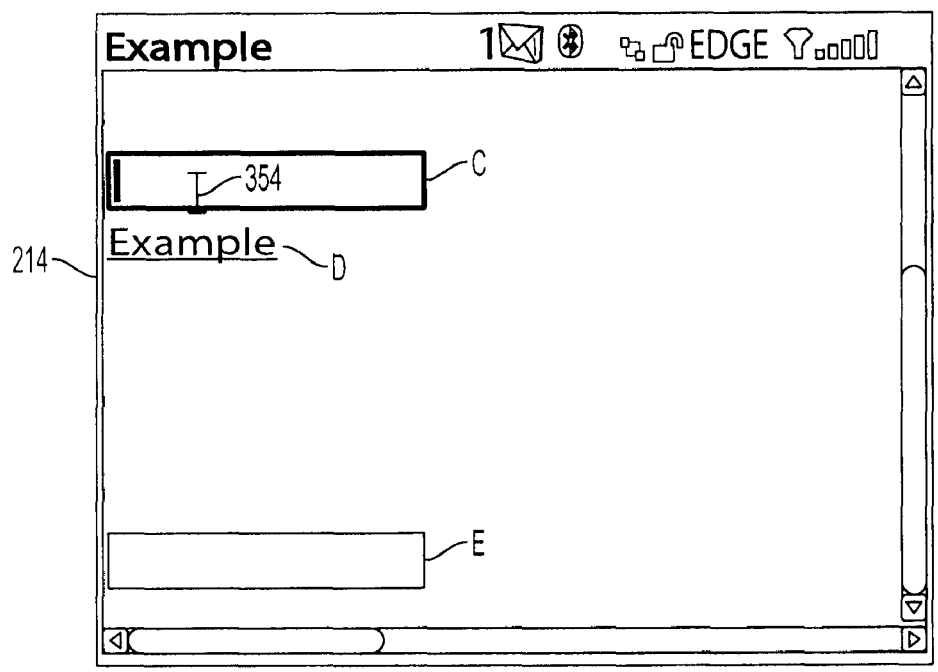

While in the desktop display mode, the user may use the trackball 218 to move the cursor 354 to an editable field C in the viewable portion 352 of the large format data file 350 (see FIGS. 3A and 6C). When the cursor 354 is near the editable field C, the cursor 354 "snaps" to the editable field C, highlighting the field C and indicating that the field C can be edited (the cursor 354 changes form to, e.g., an I-bar, to indicate that the field is able to be edited). The user may then edit the field C by using either the input keys 216 or the depressible thumb navigator 222. When the user has completed editing the field C or if the user did not desire to edit the field C, the user moves the cursor 354 with the trackball 218 away from the editable field C in order to continue navigating the viewable portion 352 of the large format data file 350.

Figure 6D:
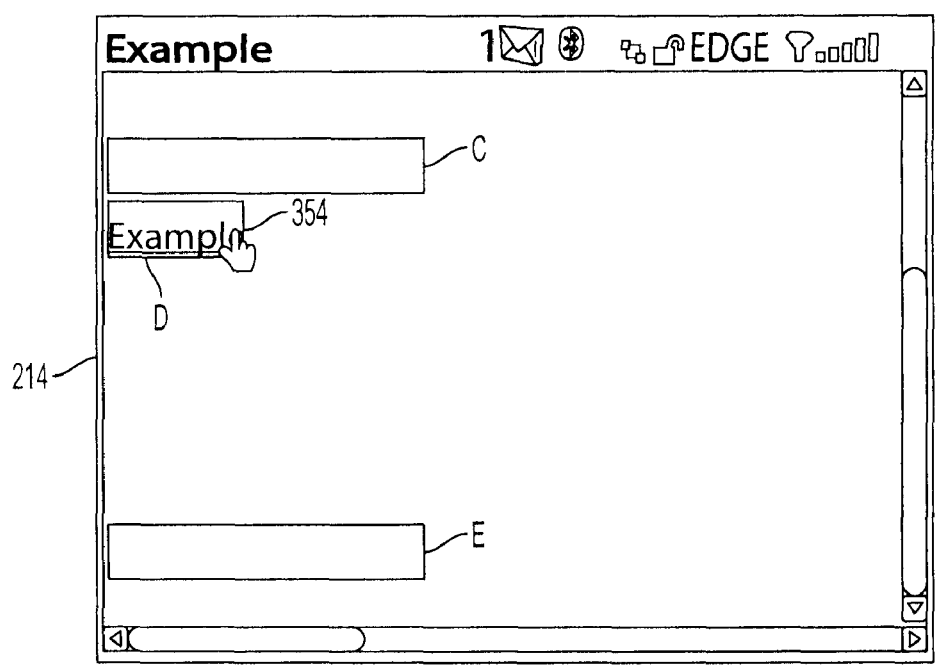

The user may also utilize active links D visible on the viewable portion 352 (see FIGS. 3A and 6D). When the user moves the cursor 354 using the trackball 218 to an active link D, the cursor 354 changes so as to indicate that the link D is an active link. The user may select the link D by using either the depressible thumb navigator 222 or by depressing the trackball 218. Selection of the link D triggers a series of actions specified by the link D including, but not limited to, opening an additional data file.

Figure 3B:
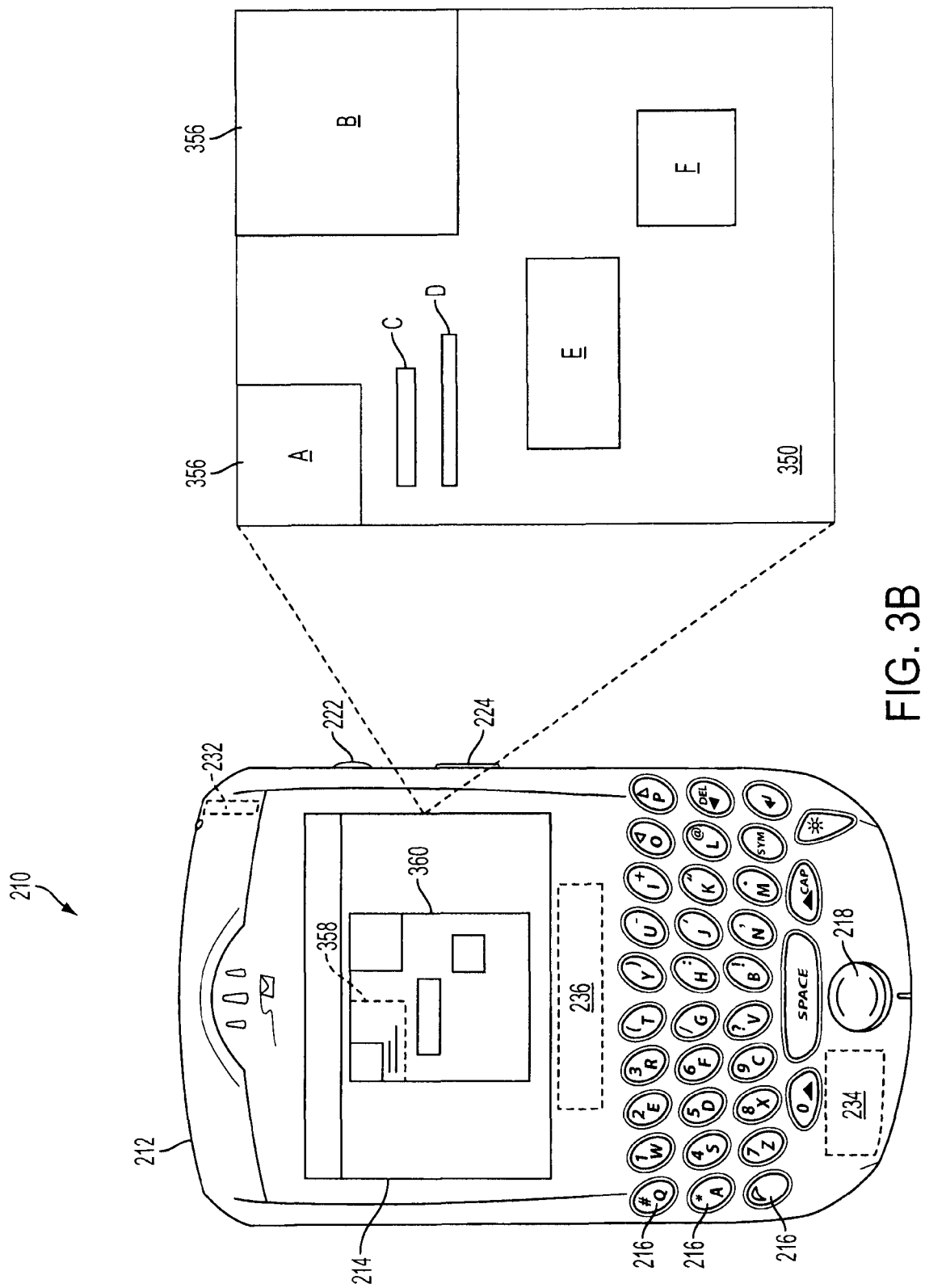
Figure 6E:
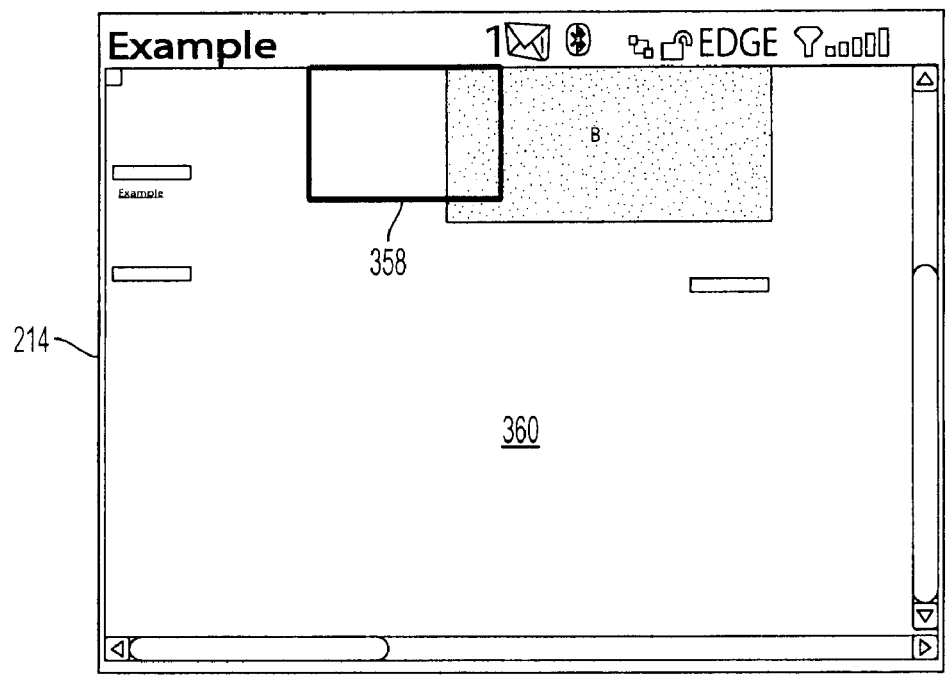

While in the desktop display mode, the user may also access a file or page overview map 360, as illustrated in FIGS. 3B and 6E. A file or page overview map 360 is a completely zoomed-out view of the large format data file 350 (i.e., the entire contents of the file is shown on the display 214). The file or page overview map 360 is accessed by using the input keys 216 or selecting the access option from a menu using either the thumb navigator 222 or the trackball 218. The file or page overview map also includes a box 358. The user moves the box 358 using the trackball 218 to any point on the displayed file or page overview map 360. By depressing either the thumb navigator 222 or the trackball 218 while the box 358 is at any point on the viewed file or page overview map 360, the rendering circuit 236 automatically zooms-in on the targeted area enclosed by the box 358. The targeted area is rendered using the file-specified resolution and dimensions.

Figure 3C:
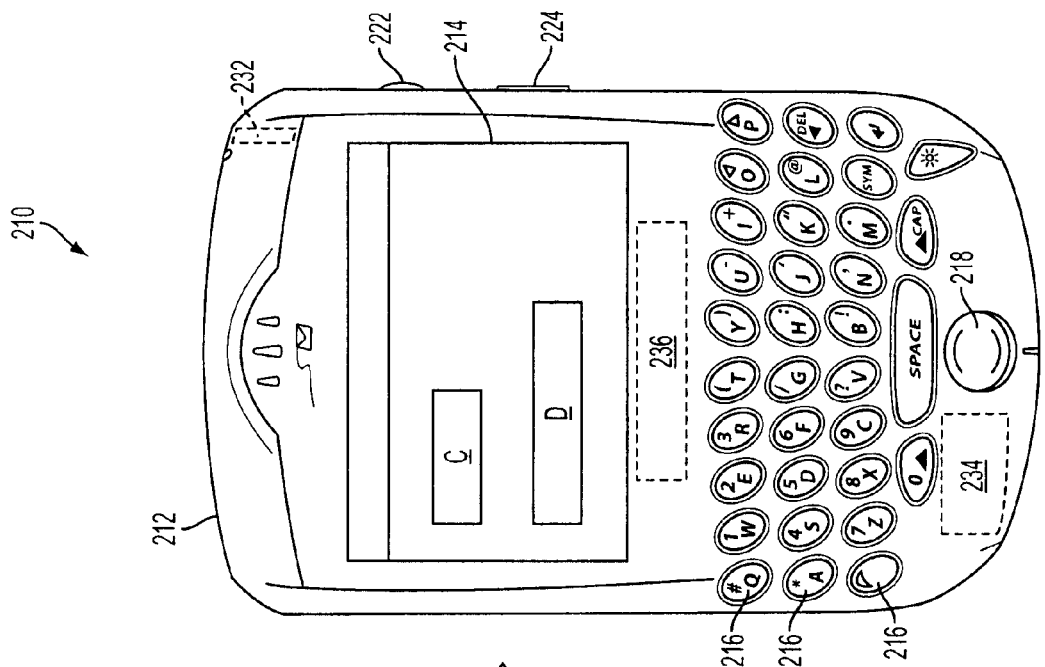
Figure 3C:
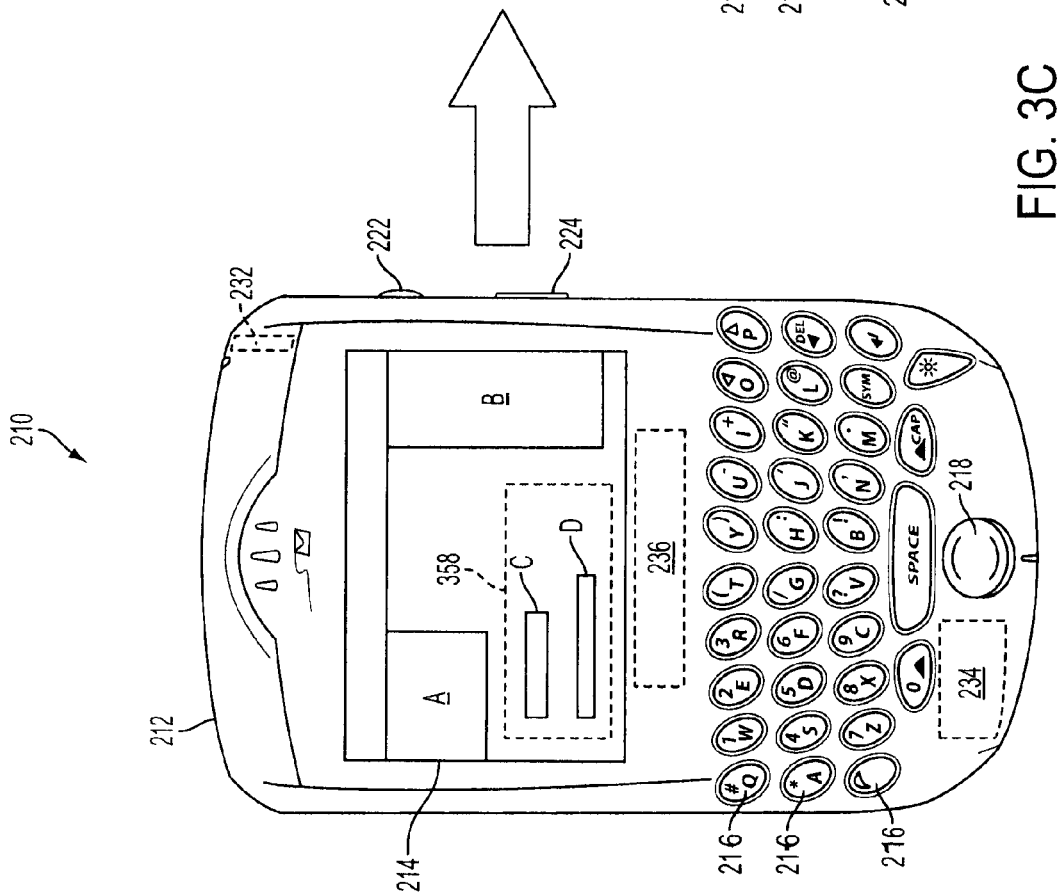
Figure 6F:
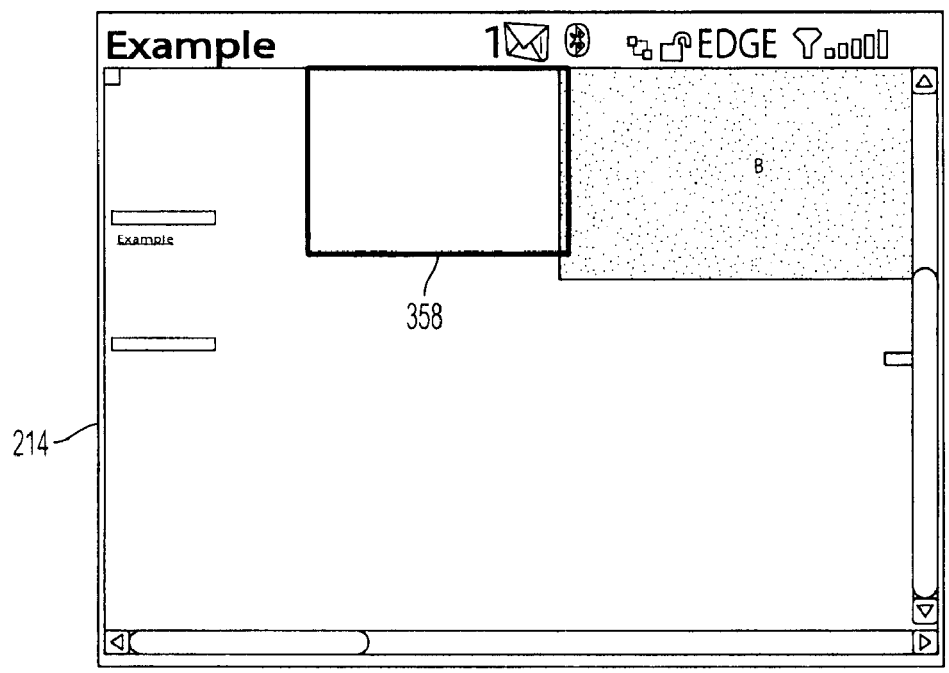

The box 358 may also be used to incrementally zoom-in on a targeted area. While in the desktop display mode, the user may change the viewing dimensions and resolutions by either zooming in or out of the viewable portion 352. In one example embodiment, to zoom in, the user moves the box 358 to enclose an area desired to be viewed in greater detail, as illustrated in FIGS. 3C and 6E. Once the box 358 is positioned, the user indicates a desire to zoom-in on the targeted area by depressing either the thumb navigator 222 or the trackball 218, and the viewable portion 352 adjusts to present a zoomed-in view of the box 358 in the display 214. The targeted area may be zoomed-in completely, as shown in FIG. 3C, or may only be incrementally enlarged, as is shown in FIG. 6F. Incremental zoom may use a predetermined value (e.g., 150%) or may be selected by the user from a list of values. The user may always zoom-out of the viewable region 352 by choosing this option (by any available input mechanism on the device 210 or display 214) whereupon the display 214 automatically zooms-out from the center of the viewable region 352 using a predetermined value (e.g., 50%).

Figure 3D:
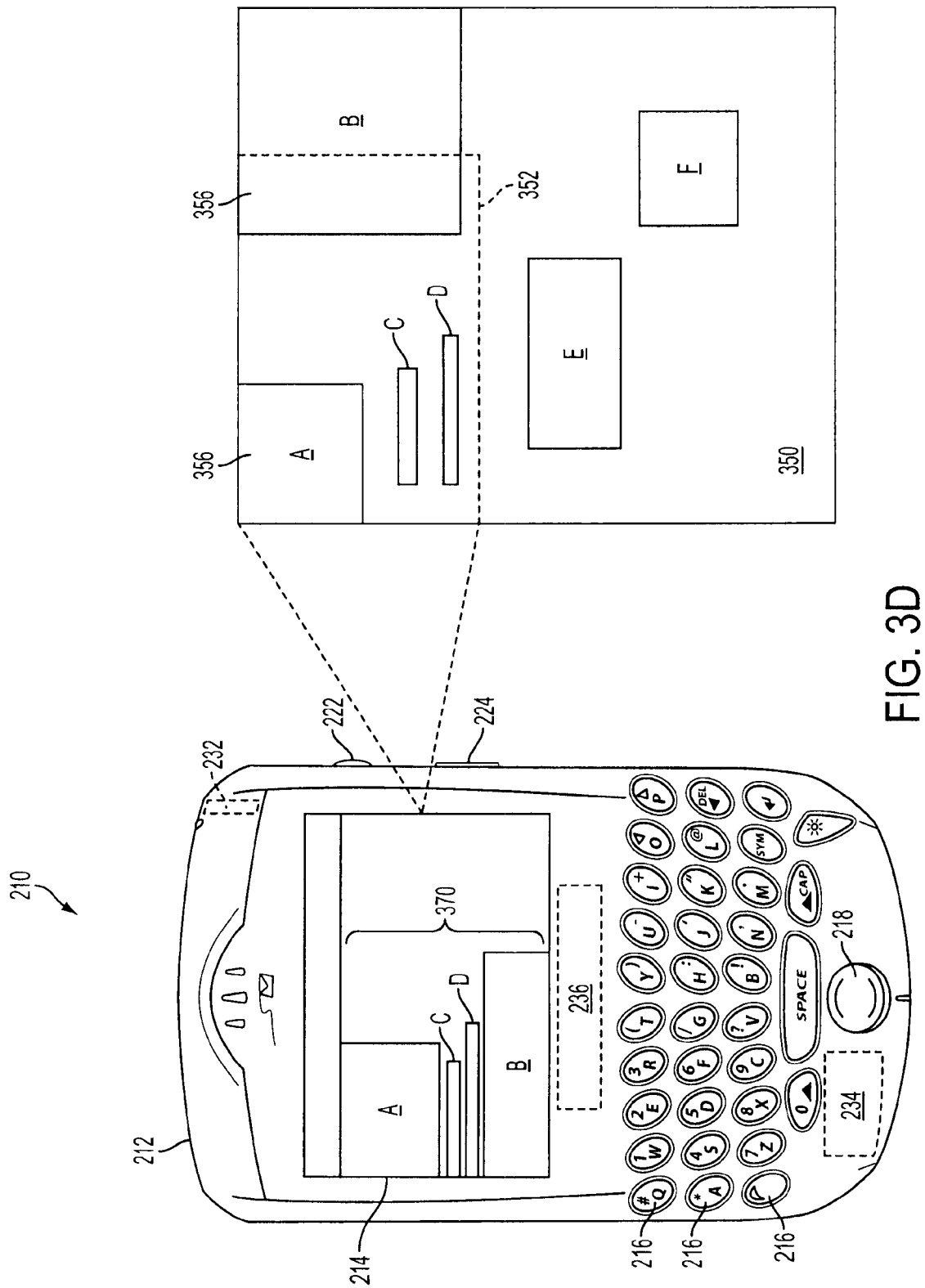

As an alternative to viewing the large format data file 350 in the desktop display mode, the rendering circuit 236 may render the large format data file 350 in the mobile display mode. FIG. 3D illustrates the large format data file 350 being rendered on the display 214 using the mobile display mode. In the mobile display mode, field C, link D and images A, B in the large format data file 350 are not displayed using the data file's predetermined element dimensions and resolutions. Instead, field C, link D and images A, B of the large format data file 350 are viewed as a list 370 of field C, link D and images A, B with minimal regard to the original spatial relationships between the large format data file elements 356. Moreover, images A and B are reduced in size, as necessary, from their large format size to fit within the dimensions of display 214. In other embodiments, images A and B can be rendered at their large format size, or at a size that is reduced or increased with respect to their large format size. The user navigates through the list 370 of elements 356 by using the thumb navigator 222 or the trackball 218. In the mobile display mode, the thumb navigator 222 and the trackball 218 are used to sequentially highlight each element 356 in the list 370. Highlighting a specific element 356 requires sequentially highlighting each element 356 until the desired element 356 is highlighted. If the highlighted element 356 is an editable field C, the field C may be edited using either the input keys 216, the depressible thumb navigator 222 or by depressing the trackball 218. Images A, B are also displayed within the list 370. An image A, B may be selected for full resolution viewing by highlighting the image A, B in the list 370 using either the thumb navigator 222 or the trackball 218 and then selecting the image A, B for viewing using either the thumb navigator 222 or by depressing the trackball 218. The image A, B is then rendered onto the display as an individual element; no information about the image's neighboring elements is conveyed. The user may zoom-in or out of the rendered image A, B by predetermined amounts (e.g., 150% or 50%, respectively). Once the user is finished viewing the image A, B, the user returns to the list 370 shown on the display 214.

Figure 7A:
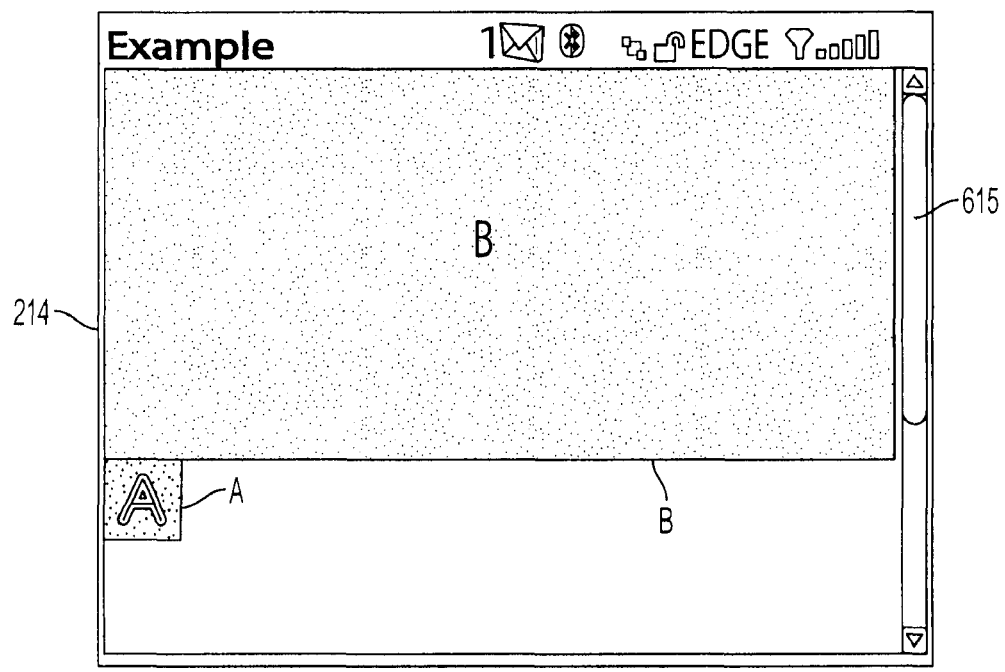
FIGS. 7A and 7B are representative screenshots of a large format data file rendered on a display in accordance with an embodiment disclosed herein.
Figure 7B:
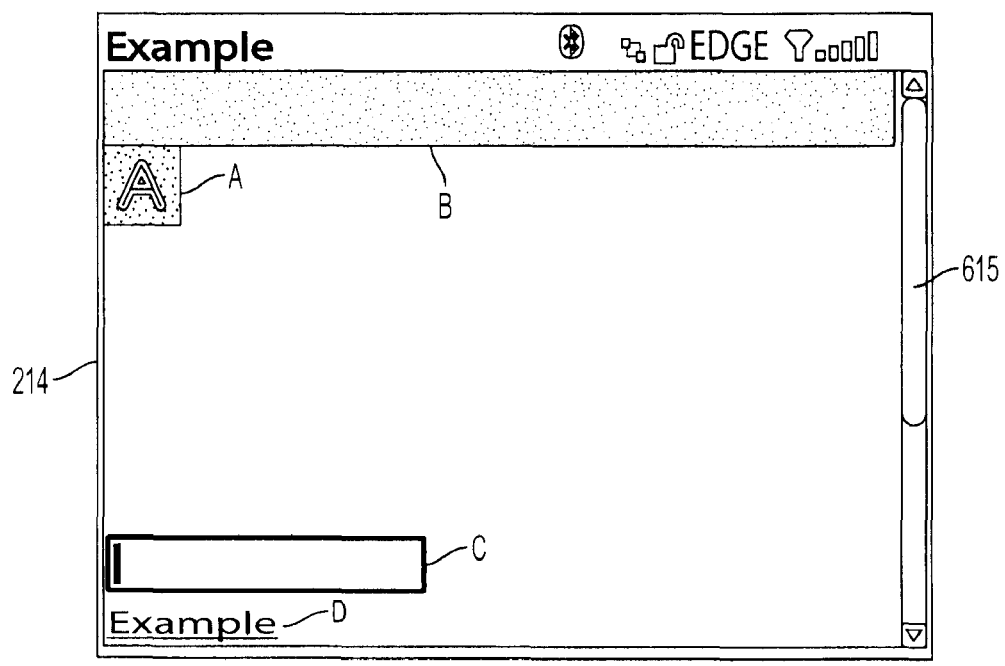

FIGS. 7A and 7B show screenshots demonstrating the mobile display mode. In FIG. 7A, a large format data file similar in layout to the large format data file 350 of FIG. 3D is rendered onto the display 214. The viewable portion includes images A and B, rendered as a list without regard to the horizontal spacing defined by the large format data file. A vertical scroll bar 615 indicates that the list continues below the currently viewable portion. By using field-to-field navigation, the user is able to scroll down through the list to reveal additional elements of the large format data file, as shown in FIG. 7B. FIG. 7B shows both field C and link D, accessible via field-to-field navigation. The display 214, as shown in FIGS. 7A and 7B, does not include a horizontal scroll bar in mobile display mode as horizontal scrolling is not available in the mobile display mode.

The mobile display mode also includes active links D in the displayed list 370. As with editable fields C, active links D may be highlighted using either the trackball 218 or the thumb navigator 222 and then selected using either the thumb navigator 222 or by depressing the trackball 218. Selecting the link D triggers the actions associated with the link D. FIG. 7B shows that field C is currently selected or highlighted, indicating that field C may be edited. The user may select link D by moving, field-to-field, from field C to link D.

The two display modes are used jointly to enhance the user's ability to view and edit large format data files on the portable electronic device 210. The desktop display mode presents spatial information in a way that allows the user to easily scroll through the data file to see the entire data file in a viewable resolution. Elements of a data file are displayed in their proper positions. Fields may be edited if viewed and selected, but navigation of the viewed data file is not limited to field-to-field navigation. On the other hand, the mobile display mode is ideal for quickly viewing data files wherein the user does not require or already has an understanding of the spatial relationships between elements of the data file. Navigation is field-to-field, or link-to-link, allowing the user to quickly navigate and edit fields without the necessity of looking for the fields in multiple dimensions.

The user of the portable electronic device 210 may configure the device 210 to always open specific types of large format data files using a user-selected display mode. For example, the user may designate that all html, xml and image files should be initially displayed using the desktop display mode. Other large format files, such as spreadsheets, may be initially displayed using the mobile display mode. Alternatively, instead of manually configuring the device 210, the user may allow the device 210 to "learn" from the user's viewing preferences and automatically determine a default configuration. For example, if the user consistently views image files or web pages using the desktop display mode, the device 210 will configure itself to automatically open image files and web pages using the desktop display mode.

The user may also alternate between display modes. While viewing a data file in desktop display mode, the user may choose to switch to mobile display mode. The user switches modes by either using the input keys 216 or using the thumb navigator 222 to signal the rendering circuit 236 to change to mobile display mode. The user may also switch from mobile display mode to desktop display mode using the same procedure. The user inputs may be through menu selections or the activation of a switch modes field on the display 214.

Figure 4:
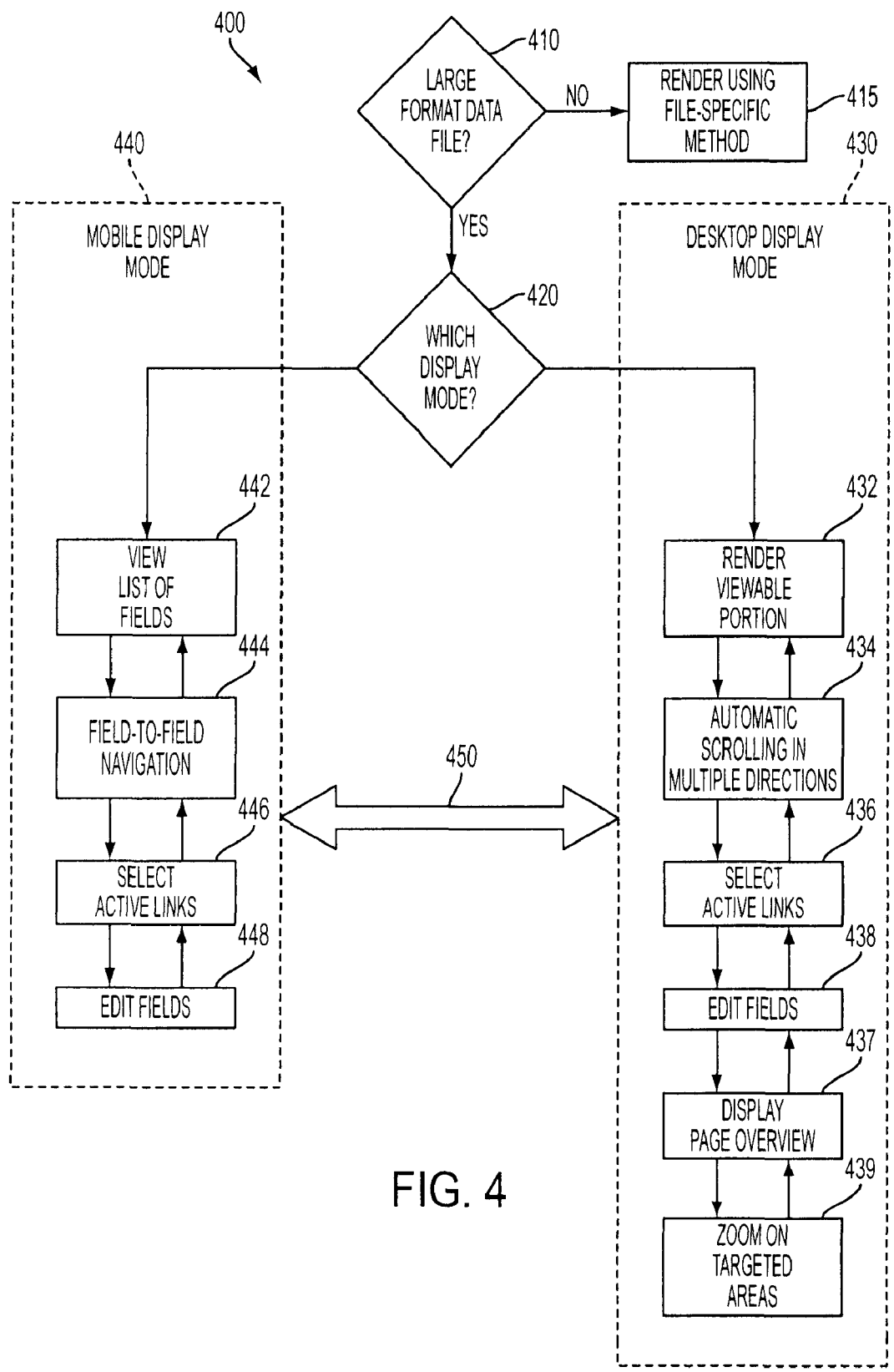
FIG. 4 is a flowchart depicting how a user of a portable electronic device views a large format data file in accordance with an embodiment disclosed herein.

FIG. 4 illustrates a method 400 for viewing and editing large format data files on a display of a portable electronic device. The method 400 may be run in a rendering circuit 890 (FIG. 5), by another circuit or processor within the portable device, by rendering software 895 (FIG. 5) or by a combination of hardware such as a circuit or a processor and software. The method 400 includes an initial determination 410 of whether a data file to be viewed is a large format data file. The determination 410 may be made based on a user-defined specification (e.g., the user specifies that all html, xml and image files are to be automatically displayed using the desktop display mode) or a default setting for the device. If the data file is not a large format data file, the data file is rendered according to some other method specific to the category of data file (block 415). On the other hand, once the data file is determined to be a large format data file, then a second determination 420 is made as to how the large format data file is to be rendered on the display. This second determination 420 may be made based on user-defined specifications, device default settings or settings learned from recorded user behavior. In other words, the device may configure itself based on user preferences recorded each time the user views a large format data file. In other embodiments, the user may be asked to make a choice manually through the use of, for example, a dialog box presented to the user on the display 214. In any of these scenarios, the device determines whether the data file to be viewed is to be rendered using the desktop display mode (block 430) or the mobile display mode (block 440).

If the data file is rendered using the desktop display mode (block 430), the device outputs a viewable portion of the data file on the display (block 432). The viewable portion is a portion of the entire rendered data file as it would appear on a large display (see e.g., FIG. 3A). Specifically, the elements of the data file are rendered using the dimensions, resolution and spatial configuration specified in the data file. The viewable portion shows only a portion of the rendered data file, but shows it using a resolution that makes it easy for a user to discern each element on the viewable portion. When the user desires to see other viewable portions of the rendered data file, the user moves an on-screen cursor in the direction of the unviewed portions of the data file which is input by the device (block 434). As the cursor is moved near an edge of the display, the device automatically scrolls the viewable portion in the direction of the approached edge to reveal previously unviewed portions of the rendered data file (see e.g., FIG. 3B). The viewable portion may be scrolled in any direction, including horizontally, vertically and diagonally based on the input movement of the cursor.

In the desktop display mode (block 430), the device may display both active links (block 436) as well as editable fields (block 438). When the user moves the cursor to or near an active link visible on the viewable portion, the device changes the appearance of the cursor so as to indicate to the user that the link is active and that selecting the link will trigger events associated with the link. When the user moves the cursor to or near an editable field, the device "snaps" the cursor to the editable field. The editable field is highlighted and the cursor changes to indicate that the user may edit the field by, for example, inputting text or selecting a displayed option. The field is unselected when the cursor is moved away from the field.

In the desktop display mode (block 430), the device is also capable of displaying a page overview map (block 437) and zooming-in on a selected area of the page overview map (block 439). In block 437, the user chooses to access a file or page overview map, a completely zoomed-out view of the data file. The page overview map is accessed by using input keys or by selecting the access option from a menu. The page overview map also includes a box. The user can move the box to any point on the displayed page overview map and then select the boxed area for a zoomed-in view of the enclosed box (block 439). In response to the user's selection the display zooms-in on the targeted area enclosed by the box. The targeted area is rendered using the file-specified resolution and dimensions. Alternatively, the targeted area may be zoomed-in incrementally, meaning that the targeted area is rendered using a resolution appropriate for the zoom level. The user may also instruct the display to zoom-out of the targeted area.

If the data file is rendered using the mobile display mode (block 440), the data file is parsed into fields and images by the device. The fields and images are displayed as a list (e.g., list 370 shown in FIG. 3D) of selectable elements requiring no horizontal scrolling in order to visualize the elements (block 442). The device allows a user to navigate the list by recognizing when a user moves a highlighted region from field-to-field or link-to-link, as displayed in the list by the device (block 444). When an element is highlighted, it may be edited if it is an editable field (block 448) or selected if it is an active link (block 446).

Based on a user request, the device may switch 450 between the desktop display mode (block 430) and the mobile display mode (block 440) at any time. Moreover, if a different large format data file is to be displayed while the first large format data file is being viewed in a specific display mode, the display mode automatically switches to the preferred display mode for the second large format data file when the second large format data file is displayed. When the second large format data file is no longer to be displayed, it may be closed and the original large format data file is displayed using the same display mode that was used just prior to the displaying of the second large format data file.

Figure 5:
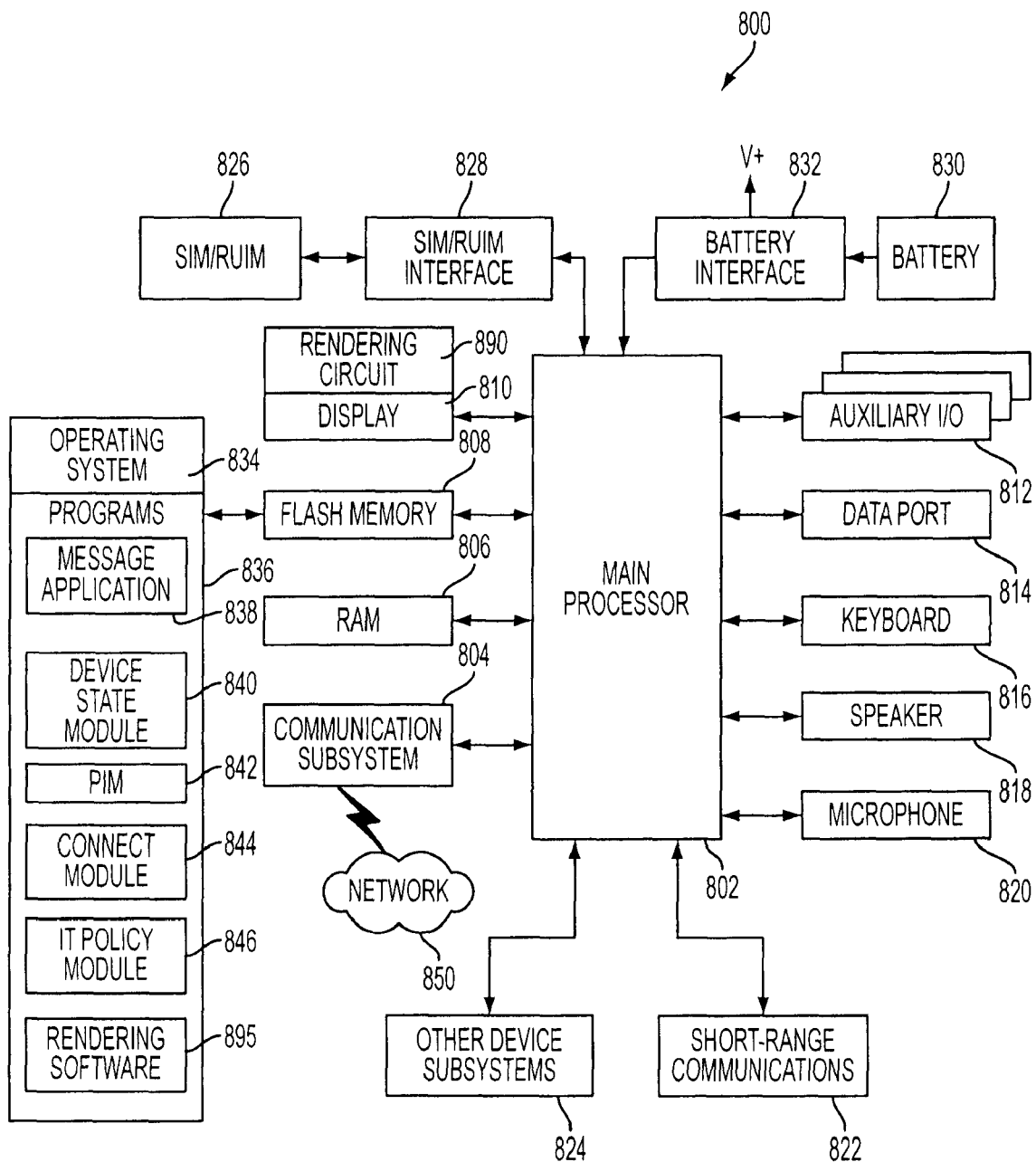
FIG. 5 is a block diagram of an example portable electronic device constructed in accordance with an embodiment disclosed herein.

Referring now to FIG. 5, a block diagram of a portable electronic device 800 is illustrated. Portable electronic device 800 is an example of portable electronic device 210. The portable electronic device 800 includes a rendering circuit 890 for rendering large format data files in either desktop display mode or mobile display mode, as described above. The rendering circuit 890 is responsive to rendering software 895 which instructs the rendering circuit to render large format data files as described above.

The portable electronic device 800 includes a number of other components such as a main processor 802 that controls the overall operation of the portable electronic device 800. Communication functions, including data and voice communications, are performed through a communication subsystem 804. The communication subsystem 804 receives messages from and sends messages to a wireless network 850. In this example embodiment of the portable electronic device 800, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with portable electronic device 800 is a GSM/GPRS wireless network in one example implementation, other wireless networks may also be associated with the portable electronic device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810 which in this example includes the rendering circuit 890, an auxiliary input/output (I/O) subsystem 812, a data port 814, a keyboard 816, a speaker 818, a microphone 820, short-range communications 822 and other device subsystems 824. Rendering circuit 890 can alternatively be a separate subsystem that communicates with both the main processor 802 and the display 814.

Some of the subsystems of the portable electronic device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The portable electronic device 800 can send and receive communication signals over the wireless network 850 after required network registration or activation procedures have been completed. Network access is associated with a subscriber or user of the portable electronic device 800. To identify a subscriber, the portable electronic device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the portable electronic device 800 and to personalize the portable electronic device 800, among other things. Without the SIM card 826, the portable electronic device 800 is not fully operational for communication with the wireless network 850. By inserting the SIM card/RUIM 826 into the SIM/RUIM interface 828, a subscriber can access all subscribed services. Services may include: web browsing and messaging such as e-mail, voicemail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

According to a preferred embodiment, the portable electronic device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the portable electronic device 800. Although current technology makes use of a battery, future technologies such as micro fuel cells may provide the power to the portable electronic device 800.

The portable electronic device 800 also includes an operating system 834 and software components 836 to 846, 895 which are described in more detail below. The operating system 834 and the software components 836 to 846, 895 that are executed by the main processor 802 are typically stored in a persistent storage such as the flash memory 808, which may alternatively be a read-only memory (ROM) or similar storage element (not shown). Those skilled in the art will appreciate that portions of the operating system 834 and the software components 836 to 846, 895 such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the portable electronic device 800 during its manufacture. Other software applications include a message application 838 that can be any suitable software program that allows a user of the portable electronic device 800 to send and receive electronic messages. Various alternatives exist for the message application 838 as is well known to those skilled in the art. Messages that have been sent or received by the user are typically stored in the flash memory 808 of the portable electronic device 800 or some other suitable storage element in the portable electronic device 800. In at least some embodiments, some of the sent and received messages may be stored remotely from the portable electronic device 800 such as in a data store of an associated host system that the portable electronic device 800 communicates with.

The software applications can further include a device state module 840 a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the portable electronic device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the portable electronic device 800 with respect to such items. This can be particularly advantageous when the host computer system is the mobile device subscriber's office computer system.

The portable electronic device 800 also includes a connect module 844, and an IT policy module 846. The connect module 844 implements the communication protocols that are required for the portable electronic device 800 to communicate with the wireless infrastructure and any host system, such as an enterprise system, that the portable electronic device 800 is authorized to interface with.

The connect module 844 includes a set of APIs that can be integrated with the portable electronic device 800 to allow the portable electronic device 800 to use any number of services associated with the enterprise system. The connect module 844 allows the portable electronic device 800 to establish an end-to-end secure, authenticated communication pipe with the host system. A subset of applications for which access is provided by the connect module 844 can be used to pass IT policy commands from the host system to the portable electronic device 800. This can be done in a wireless or wired manner. These instructions can then be passed to the IT policy module 846 to modify the configuration of the portable electronic device 800. Alternatively, in some cases, the IT policy update can also be done over a wired connection.

The IT policy module 846 receives IT policy data that encodes the IT policy. The IT policy module 846 then ensures that the IT policy data is authenticated by the portable electronic device 800. The IT policy data can then be stored in the flash memory 806 in its native form. After the IT policy data is stored, a global notification can be sent by the IT policy module 846 to all of the applications residing on the portable electronic device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Rendering software 895 is used to control the rendering circuit 890 to render large format data files in either the desktop display mode or the mobile display mode, as discussed above. In general, data file rendering is fully controlled by either the rendering circuit 890, the rendering software 895 or a combination of both the rendering circuit 890 and software 895.

Other types of software applications can also be installed on the portable electronic device 800. These software applications can be third party applications, which are added after the manufacture of the portable electronic device 800. Examples of third party applications include games, calculators, utilities, etc.

The additional applications can be loaded onto the portable electronic device 800 through at least one of the wireless network 850, the auxiliary I/O subsystem 812, the data port 814, the short-range communications subsystem 822, or any other suitable device subsystem 824. This flexibility in application installation increases the functionality of the portable electronic device 800 and may provide enhanced on-device functions, communication-related functions, or both. For example, secure communication applications may enable electronic commerce functions and other such financial transactions to be performed using the portable electronic device 800.

The data port 814 enables a subscriber to set preferences through an external device or software application and extends the capabilities of the portable electronic device 800 by providing for information or software downloads to the portable electronic device 800 other than through a wireless communication network. The alternate download path may, for example, be used to load an encryption key onto the portable electronic device 800 through a direct and thus reliable and trusted connection to provide secure device communication.

The data port 814 can be any suitable port that enables data communication between the portable electronic device 800 and another computing device. The data port 814 can be a serial or a parallel port. In some instances, the data port 814 can be a USB port that includes data lines for data transfer and a supply line that can provide a charging current to charge the battery 830 of the portable electronic device 800.

The short-range communications subsystem 822 provides for communication between the portable electronic device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 via rendering circuit 890 or using rendering software 895. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, depressible trackball, infrared fingerprint detector, a depressible thumb navigator or other buttons. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the portable electronic device 800 is substantially similar, except that the received signals are output to the speaker 818, and signals for transmission are generated by the microphone 820. Alternative voice or audio I/O subsystems, such as a voice message recording subsystem, can also be implemented on the portable electronic device 800. Although voice or audio signal output is accomplished primarily through the speaker 818, the display 810 can also be used to provide additional information such as the identity of a calling party, duration of a voice call, or other voice call related information.

Although the embodiments and applications as described above relate to a portable electronic device, it should be understood that they may also be embodied in and applied with any electronic device that has a narrow display for visualizing large format data files. Additionally, although a trackball has been specifically used in the figures and description above, other embodiments of the invention exist wherein a trackball is replaced by other high resolution cursor control devices, including but not limited to joysticks and touchpads. Furthermore, as explained above, the functionalities of the described rendering circuit may be implemented as either hardware, software or a combination of both hardware and software.

Specific embodiments and applications related to the above description include, but are not limited to, a method of displaying large format data files on a display of a portable electronic device. The large format data files have predetermined dimensions and resolution. The method includes entering a first mode to render a viewable portion of a large format data file on the display using the large format data file's predetermined dimensions and resolution. The method also includes displaying non-viewable portions of the large format data file in response to a user moving a cursor on the display near an edge of the viewable portion of the large format data file. The non-viewable portions are displayed by automatically scrolling the viewable portion in the direction of the approached edge to reveal an updated viewable portion of the large format data file.

An additional embodiment and application includes a system for displaying large format data files on a portable electronic device. The system includes a display for displaying large format data files. The system also includes a processor for controlling the display. The processor controls the display in a first display mode wherein the display shows a viewable portion of a large format data file using a file-specified resolution. A user is also enabled to view and edit the large format data file while the processor controls the display in the first display mode. The processor also controls the display in a second display mode wherein the display shows a plurality of fields of the large format data file as a list of editable fields.

A portable electronic device is also included as an embodiment of the above description. The portable electronic device includes a portable housing, a display mounted on the portable housing and a trackball for manipulating a cursor viewable on the display. The trackball is also mounted on the portable housing. The device further includes electronic circuitry to render data files on the display. The electronic circuitry is mounted in the portable housing. The device includes a rendering application for instructing the electronic circuitry to render a large format data file on the display using a plurality of display modes. One display mode is a desktop display mode, wherein the device displays a viewable portion of a large format data file on the display using a file-specified resolution. In the desktop display mode, the user is enabled to view and edit the large format data file. Another display mode is a mobile display mode, wherein the device displays a plurality of fields of the large format data file as a list of editable fields.

Further embodiments described include a rendering application for rendering a large format data file onto a display. The rendering application includes instructions to direct a processor to render a viewable portion of the large format data file onto the display wherein the viewable portion is rendered with a resolution specified by the large format data file. Also included are instructions to direct a processor to render a cursor onto the display. Additionally, the rendering application includes instructions to direct a processor to render non-viewable portions of the large format data file in response to a user-directed movement of the cursor towards an edge of the display resulting in the non-viewable portions being automatically scrolled onto the display from the direction of the approached edge.

An additional embodiment described is a user interface for displaying a large format data file. The user interface includes displaying means for displaying a viewable portion of the large format data file. Horizontal scrolling means are provided for horizontally shifting the viewable portion of the large format data file visible on the displaying means. The horizontal scrolling means include a cursor that, when moved near an edge of the displaying means, shifts the viewable portion of the large format data file in the direction of the approached edge. The user interface also includes editing means for editing fields displayed by the displaying means.

A further embodiment includes a browser for displaying a large format data file on a display. The browser includes a selection tool configured to allow a user to select between a desktop display mode and a mobile display mode. If the desktop display mode is selected, the browser also includes a cursor for shifting a viewable portion of the large format data file to any region of the large format data file. The viewable portion is shifted automatically as a result of the cursor being moved near an edge of the display. The cursor is also used to select fields visible on the viewable portion of the large format data file. Additionally, if the desktop display mode is selected, the browser includes a highlighted region to indicate that a field has been selected for editing. Conversely, if the mobile display mode is selected, the browser includes a vertically-arranged list of fields from the large format data file as well as a highlighted region to navigate from field to field within the list of fields.

Other examples, embodiments and applications related to the above description but not heretofore explained in detail are nevertheless considered pertinent and are to be considered within the scope of the following claims.

What is claimed is:

1. A method of displaying large format data files with elements having a file-specified spatial relationship on a display of a portable electronic device comprising:
   entering a first display mode to render one or more elements from the large format data file as a scrollable vertical list of elements without maintaining the file-specified spatial relationship between elements; and
   receiving a selection signal to change to a second display mode; and
   switching from the first display mode to the second display mode in response to the selection signal, wherein the second display mode includes rendering a viewable portion of the large format data file on the display while keeping elements of the large format data file in the file-specified spatial relationship, and wherein the second display mode permits scrolling of the viewable portion to display non-visible portions of the large format data file.

2. The method of claim 1, further comprising, when in the first display mode, receiving selection of one of the elements, and, in response to the selection, indicating that the one of the elements is an editable field.

3. The method of claim 1, further comprising storing a preferred initial display mode for the device, and wherein the preferred initial display mode is used when first displaying a new data file.

4. The method of claim 1, wherein one of the elements comprises an editable field within the viewable portion of the large format data file, and wherein the method further comprises, when in the second display mode, receiving selection of the editable field, receiving input, and entering the input to editable field.

5. The method of claim 1, further comprising, when in the second display mode, receiving selection of a selected region of the viewable portion based on a navigable box, and zooming-in on the selected region.

6. The method of claim 1, wherein one of the elements comprises an active link, and wherein the method further comprises linking to an additional data file in response to selection of the active link.

7. The method of claim 1, further comprising initially determining that the large format data file is a large format file.

8. A portable electronic device comprising:
a display for displaying large format data files; and
a processor for controlling the display, wherein the processor is configured to cause the display to render a large format data file in a first display mode to render one or more elements from the large format data file as a scrollable vertical list of elements without maintaining the file-specified spatial relationship between elements,
and wherein the processor is configured to switch between the first display mode and a second display mode in response to a selection signal,
and wherein the processor is configured to render the large format data file in the second display mode by rendering a viewable portion of the large format data file on the display while keeping elements of the large format data file in the file-specified spatial relationship, and wherein the second display mode permits scrolling of the viewable portion to display non-visible portions of the large format data file.

9. The portable electronic device of claim 8 further comprising:
a portable housing having the display mounted thereon;
a input device for manipulating a cursor viewable on the display, the input device mounted on the portable housing; and
a memory storing the large format data file and a rendering application, wherein the rendering application is executable by the processor and includes program instruction for configuring the processor to operate in the first display mode and the second display mode.

10. The device of claim 9, wherein the rendering application is configured to store a preferred initial display mode for the user of the device and wherein the preferred initial display mode is used when first displaying a new data file.

\* \* \* \* \*